April 20, 1954  T. R. KENNEDY ET AL  2,676,235
CONTROL MEANS FOR INDUCTION FURNACES
Filed March 8, 1952  3 Sheets-Sheet 1

INVENTORS
THEODORE R. KENNEDY
BY WILLIAM A. KELLER
Albert Sperry
ATTORNEY

April 20, 1954   T. R. KENNEDY ET AL   2,676,235
CONTROL MEANS FOR INDUCTION FURNACES
Filed March 8, 1952   3 Sheets-Sheet 2

INVENTORS
THEODORE R. KENNEDY
BY WILLIAM A. KELLER
Albert Sperry.
ATTORNEY

April 20, 1954 T. R. KENNEDY ET AL 2,676,235
CONTROL MEANS FOR INDUCTION FURNACES
Filed March 8, 1952 3 Sheets-Sheet 3

INVENTORS
THEODORE R. KENNEDY
BY WILLIAM A. KELLER
Albert Sperry.
ATTORNEY

Patented Apr. 20, 1954

2,676,235

UNITED STATES PATENT OFFICE

2,676,235

CONTROL MEANS FOR INDUCTION FURNACES

Theodore R. Kennedy, Lower Makefield Township, Pa., and William A. Keller, Trenton, N. J., assignors to Ajax Electrothermic Corporation, Trenton, N. J., a corporation of New Jersey Application March 8, 1952, Serial No. 275,574

9 Claims. (Cl. 219—20)

This invention relates to systems for controlling the operation of induction furnaces and is directed particularly to means for maintaining such operations at high efficiency.

It is well known that the efficiency of an induction furnace and the work done by the current impressed on the furnace circuit can only be maintained high if the current and the voltage of the generator are kept substantially in phase. The maximum current then flows at the highest voltage and the power factor of the generator system approaches unity. While this condition can be readily established by introducing the correct capacity into the circuit, the inductance of the circuit varies greatly during operation and may increase as much as tenfold as the furnace charge rises in temperature and becomes molten. Even when the furnace is used for heat treating or surface hardening of pieces the inductance of the furnace circuit changes greatly. These changes in inductance result in changes of phase of the generator voltage with respect to the current and it is accordingly necessary to make compensating changes in capacity of the furnace circuit to restore the voltage and current to the same phase and maintain a power factor approaching unity.

The adding of capacity to the furnace circuit is generally effected by including additional capacitors in the circuit and at least some of these are necessarily of large capacity. However if a capacitor of large capacity is cut out of the circuit during operation severe arcing takes place at the contacts and the circuit may be overloaded due to the surging of currents. This can largely be overcome by the addition of the required capacity in small substantially uniform increments at a time but the number and type of variable capacitors which would be required to permit such gradual changes over the entire range of variations encountered in many furnace operations would be prohibitive and the circuits and switches required would be extremely complicated. Moreover the control means heretofore employed for changing the order and arrangement of capacitors in the circuit have involved a large number of push buttons or other means which must be operated in a predetermined sequence. Because of the care needed to insure proper operation of such push buttons a skilled technician is required and even then errors are liable to occur resulting in overloading of the circuit and severe arcing of the contacts.

Such arcing can be avoided by breaking the generator circuit before changing the arrangement of the capacitors but this has always required additional switch operating means which complicate the control operation and there is always the possibility that an operator will forget to pull the generator switch before changing the capacitors. Furthermore the switches employed in controlling the furnace circuit are generally actuated by relays and the inherent time lag in their operation sometimes results in the cutting out of a capacitor before the generator circuit is effectively broken.

The control means provided in accordance with the present invention embody a single control means which precludes inadvertent or improper operation of the switching means and insure the proper sequence of movements and the breaking of the generator circuit when adding or removing large capacity to the furnace circuit. This is preferably accomplished by providing a single operating shaft which is movable in one direction to make and break the generator circuit and movable in another direction to vary the capacity of the circuit. The construction is such that the two movements must be made consciously and successively and the change in capacity to the circuit cannot be effected inadvertently or without first breaking the generator circuit.

In one preferred form of the invention a single divided capacitor is used in combination with as many relatively large unit capacitors as may be required. The divided capacitor is used to step up the capacity of the circuit by small uniform increments until a capacity approaching that of a unit capacitor is reached. The generator circuit is then broken while a unit capacitor is cut in and the divided capacitor is cut out. The divided capacitor is thereafter used a second time to increase the capacity by additional small uniform increments until a second unit capacitor can be added to the circuit. In the alternative an arrangement of divided capacitors varying in capacity by geometrical progression may be used with suitable controls to effect the addition of capacity in unit stages over a sufficient range to maintain the generator circuit continuously in balance and operating at high efficiency.

One of the objects of the present invention is to maintain high efficiency in the operation of induction furnaces with a minimum of danger to the generator circuit and its controls.

Another object of the present invention is to provide control means for an induction furnace circuit which permit gradual adjustments over a wide range and preclude undesired or inadvertent changes in these adjustments.

A further object of the invention is to provide control means requiring conscious and successive operation for breaking the generator circuit before making any substantial change in the arrangement of the capacitors in the circuit.

A specific object of the invention is to provide control means for such circuits which are movable in one direction to break the generator circuit and thereafter movable in another direction to vary the capacity of the circuit.

These and other objects and features of the invention will appear from the following description thereof in which reference is made to the figures of the accompanying drawings.

Figure 1:
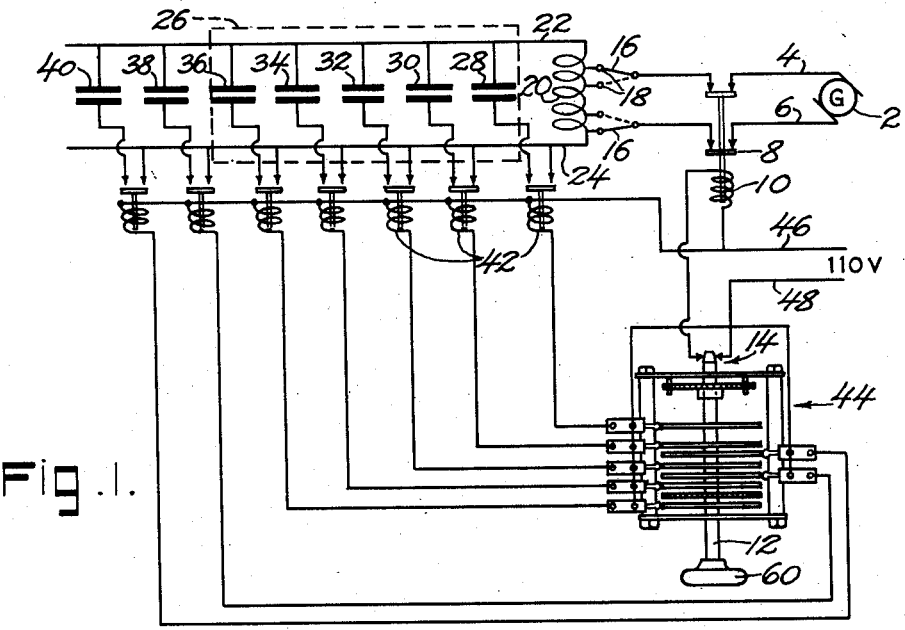
Figure 1 is a diagrammatic illustration of a typical induction furnace circuit embodying the present invention.

In those forms of the invention chosen for purposes of illustration in the drawings the control mechanism is designed to vary the capacity of an induction furnace circuit so as to maintain the power factor of the generator circuit as near unity as possible during operation. A typical circuit embodying such control means includes the generator 2 from which extend the power lines 4 and 6. These lines include a generator switch 8 adapted to be held in a normally closed position by the action of a relay 10 under the control of a spring pressed shaft 12 engageable with the actuating member of a micro-switch 14. The lines 4 and 6 lead to adjustable switch arms 16 engageable with selected points 18 on the furnace coil 20. The arms 16 are movable in a conventional manner to effect a greater or lesser autotransformer action in the coil 20 depending upon the type of metal being melted or treated in the furnace and the temperatures and conditions of operation to be maintained.

Lines 22 and 24 extend from coil 20 to the opposite sides of a divided capacitor 26 including elements 28, 30, 32, 34 and 36 of substantially equal capacity and to the opposite sides of the unit capacitors 38 and 40, of which 38 has a capacity substantially equal to the total capacity of the divided capacitor 26 plus one section of capacitor 26, and capacitor 40 has a capacity equal to twice that of capacitor 38. That is, if the parts of capacitor 26 are each of 1 microfarad rating, capacitor 38 will be of 6 microfarads and capacitor 40 will be of 12 microfarads. The capacitors are arranged to provide a resonant circuit in combination with the coil 20. The capacitors 26, 38 and 40 are brought into the circuit including coil 20 by means of the relays 42 selectively controlled by the device indicated generally at 44 and including the spring pressed shaft 12. The relays 10 and 42 are supplied with current from the low voltage line one side 46 of which extends to the relays and the opposite side 48 of which extends to the control device 44.

Figure 2:
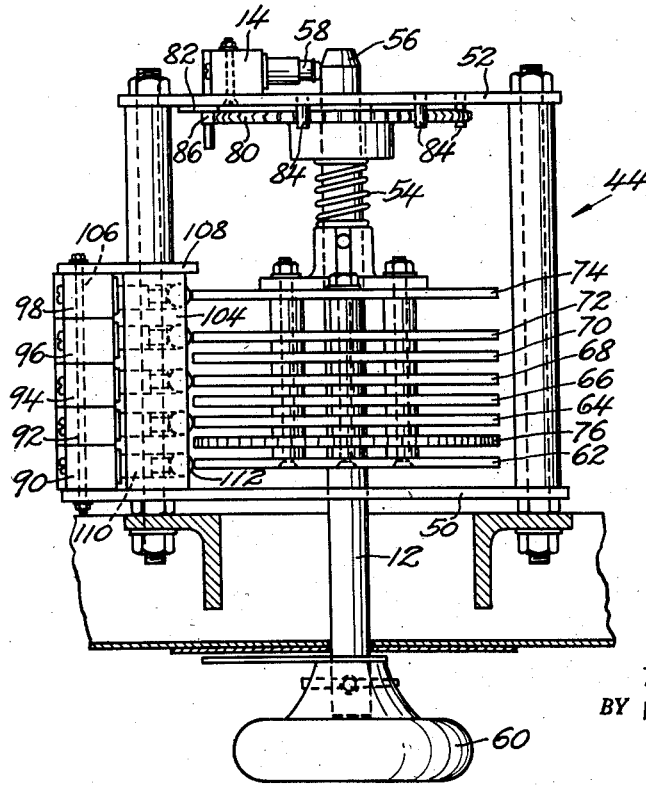
Figure 2 is a side elevation of a preferred form of control device for use in the circuit of Figure 1.
Figure 3:
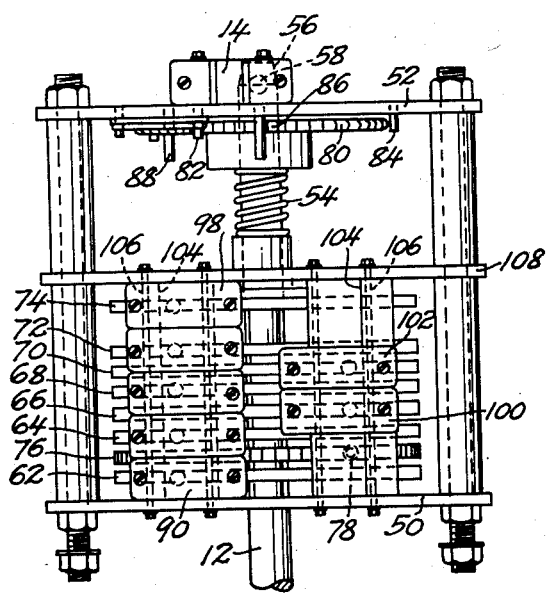
Figure 3 is a top plan view of the control device illustrated in Figure 2.
Figure 4:
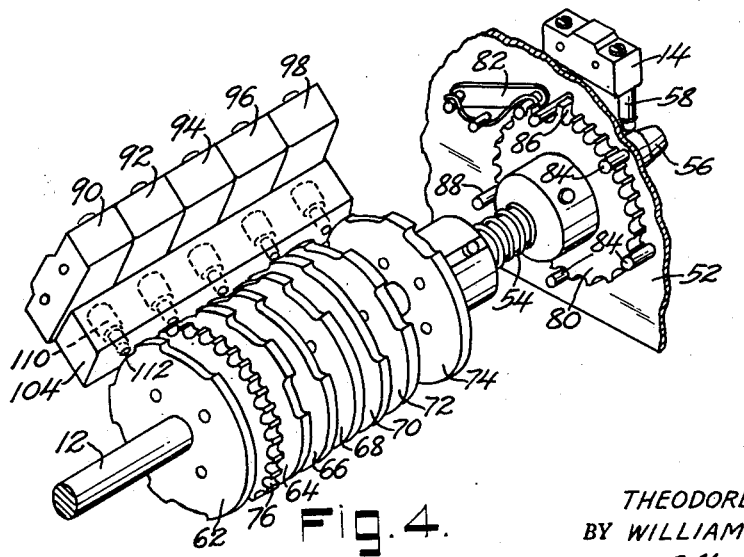
Figure 4 is a perspective showing the construction of Figure 2 with parts broken away.
Figure 7:
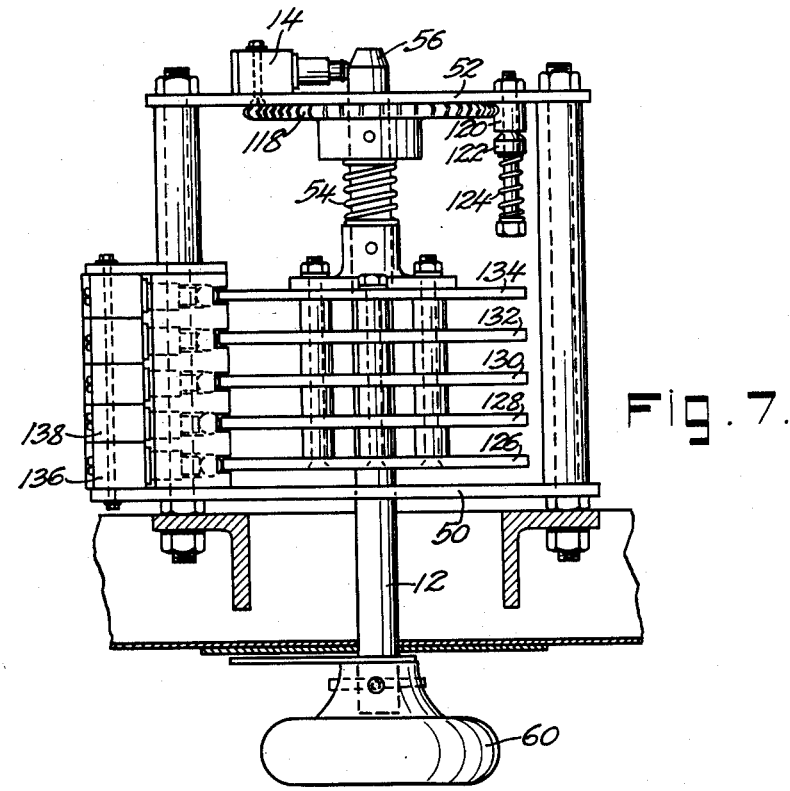
Figure 7 is a side elevation of an alternative form of control means embodying the present invention and, Figures 8 to 12 illustrate typical cams which may be used in the control device.
Figure 8:
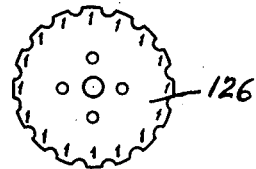
Figure 9:
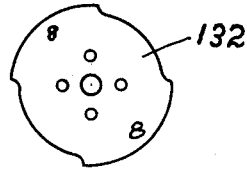
Figure 10:
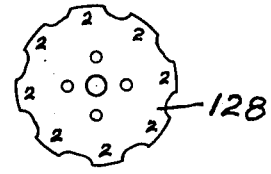
Figure 11:
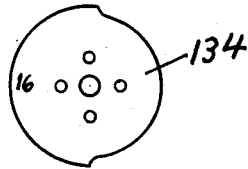
Figure 12:
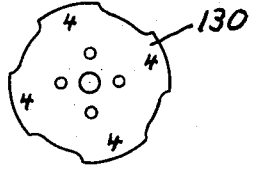

The preferred form of control device 44 illustrated in Figures 2, 3 and 4 includes the shaft 12 mounted for rotary and axial movement in the front and rear supporting plates 50 and 52 respectively. Shaft 12 is normally urged to the right as seen in Figure 4 by means of a spring 54 so that it will assume a projected position in which the tapered end 56 of shaft 12 engages the actuating member 58 of micro-switch 14 to complete a circuit through the relay 10 and generator switch 8 and maintain the generator circuit closed. However, the shaft may be retracted by pulling on handle 60 to disengage the actuating member 58 and cause the generator circuit to be broken.

Figure 5:
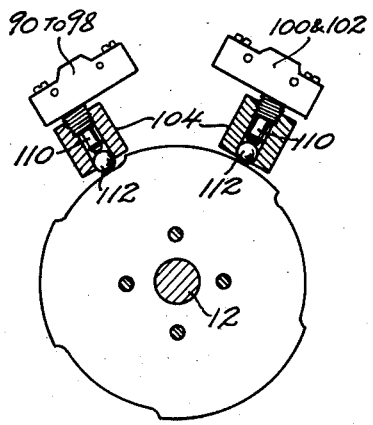
Figure 5 is a sectional view of the control device of Figures 2 and 3 showing the manner in which the micro-switches are mounted and operated.
Figure 6:
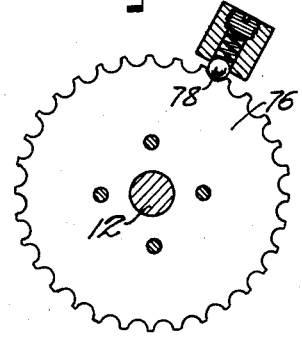
Figure 6 is a sectional view of the control device showing the feeler plate and detent.

The handle 60 and shaft 12 are rotatable step by step in a clockwise direction to rotate capacitor varying cam plates indicated at 62, 64, 66, 68, 70, 72 and 74. A feeler plate 76 is also carried by shaft 12 and is provided on its periphery with notches engageable by the spring pressed detent 78 as shown in Figure 6 to enable the operator to tell by feel each time the shaft and cam plates have rotated a single step. A similarly notched control plate 80 carried by shaft 12 is located near the rear supporting plate 52 and is engageable by the spring pressed pawl 82 as shown in Figure 5 to permit rotation of shaft 12 in a clockwise direction only as long as the pawl engages the control plate. However when shaft 12 is retracted by pulling on the handle 60 the control plate is moved out of engagement with pawl 82. Shaft 12 then may be rotated in either direction and the number of steps the shaft is moved will be made evident to the operator by the step by step movement afforded by the spring pressed detent 78 engaging the feeler plate 76.

Stop pins 84 are located at spaced points about the control plate 80 in position to be engaged by a projection 86 on rotation through a limited arc corresponding to, say, five steps of rotation of the shaft 12, or whatever number of steps may be necessary to include each of the capacitor elements of the divided capacitor 26 in the circuit. However the pins 84 are of such length that when shaft 12 is retracted by pulling outward on handle 60 against the action of spring 54 a distance sufficient to insure breaking of the generator circuit, the projection 86 will clear the ends of stop pins 84 and permit the shaft 12 to be rotated further in a clockwise direction or to be turned backward to eliminate one or more elements of capacitor 26 from the circuit. A terminal pin 88 which is longer than the stop pins 84 is positioned to be engaged by projection 86 upon nearing the completion of a single clockwise rotation of the shaft 12 from an initial position.

As shown in Figures 4 and 5, switches 90, 92, 94, 96, 98, 100 and 102 are mounted on switch blocks 104 held in place by tie rods 106 extending between the front plate 50 and a central supporting plate 108 of the control device. Each switch is provided with an actuating member 110 which bears against a ball or rotatable cam follower 112 housed within a recess in the switch block 104 and is positioned to engage the edge of one of the cam plates 62, 64, 66, 68, 70, 72 and 74. Rotation of the cam plates therefore causes the switches to be selectively operated in a predetermined order to actuate the relays 42 associated with the capacitors for progressively adding or removing the capacity required in the circuit as the furnace operation continues. A limited amount of capacity corresponding to the limited arc of rotation between the stop pins 84 can therefore be added as successive substantially equal elements of the divided capacitor 26 without breaking the generator circuit. However no capacitors or elements can be cut out without breaking the generator circuit since the pawl 82 engaging control plate 80 prevents counterclockwise rotation of shaft 12 as long as it is in its projected position.

When an element of the divided capacitor 26 is to be removed from the circuit or when a larger capacitor is to be added to the circuit, as for example after projection 86 engages a stop pin 84, it is necessary to retract the shaft 12 axially a distance sufficient to allow projection 86 to clear the stop pin 84 before further rotation of the shaft is possible. Such movement requires a conscious action and imposes a physical delay in the operation of rotating the shaft insuring time for complete operation of relay 10 and switch 8 to break the generator circuit before the capacitors are cut out and a new one cut in. When shaft 12 is so retracted control plate 80 is disengaged from the pawl 82 and the shaft may be rotated in either direction. However, the feeler plate 76 and detent 78 still prevent free rotation of the shaft and give the operator a consciousness of the step by step movement through which the shaft is rotated.

When projection 86 has cleared a stop pin 84 and been rotated one step further it releases the divided capacitor 26 and inserts the next larger unit capacitor 38 or 40 into the circuit. Successive steps in rotation of the shaft will again add the desired substantially uniform increments of capacitor 26. Variations of this type will be controlled by the form of the cam plates and the electrical connection established and broken by the switches actuated by the cam plates.

The number and form of the cam plates employed and the type of switch and capacitor circuits used may of course be varied greatly. As shown in the drawings the switches are of the micro-switch type and the capacitors are arranged in parallel. However one or more capacitors may be arranged in series with others and any suitable number and type of cam plates may be used to add or remove substantially uniform units of capacity to the circuit with each step of rotation of the shaft 12. The actual furnace current is not impressed on the control circuit of the system and therefore the size and cost of the control device can be greatly reduced and it may be simplified in construction.

In order to illustrate an alternative manner in which the control device may operate it may be assumed that the divided capacitor 26 includes elements or stages varying in geometrical progression, such as 1, 2, 4, 8 and 16 microfarads respectively, whereas the unit capacitors 38 and 40 may be of 32 and 64 microfarad capacity respectively. When the capacitors have such values, the form of control device shown in Figures 7 to 12 is sometimes preferable. In this construction the shaft 12 is mounted as before and is urged to a projected position by spring 54. The end of the shaft is tapered as in Figure 2 for actuating the generator circuit breaking relay 10. A notched feeler plate 118 is located adjacent the rear supporting plate 52 of the assembly and engageable with a fixed stud 120 on plate 52. A pressure member 122 is urged toward the front face of the feeler plate by a spring 124 and is positioned to enter a short way into the notches about the plate so as to position the feeler plate for return into engagement with the stud 120 on release of the handle 60.

The cams 126, 128, 130, 132 and 134 are carried by shaft 12 and have the form shown in Figures 8 to 12 wherein the numbers about the periphery may be considered as indicating the number of microfarads included in the circuit when that point is brought into position to actuate the switches associated therewith.

With this construction the generator circuit is broken upon every change in capacity since shaft 12 must be retracted sufficiently to cause the feeler plate 112 to disengage the stud 120 before the shaft and cams can be rotated. The generator circuit therefore must be broken in order to make any change in the furnace circuit and the pressure member 122 bearing against the feeler plate enables the operator to feel the step by step rotation of the plate in changing capacitors. Thereafter on release of handle 60 the shaft will return to its projected position to complete the generator circuit and the bevelled end of the pressure member will serve to align the notches in the feeler plate with the stud so that correct positioning of the plate and stud are assured.

In using this construction the first step of rotation of the shaft 12 in a clockwise direction will cause cam plate 126 to actuate the associated micro-switch 136 whereupon a circuit is closed to energize a relay and contactor to include a first unit of one microfarad capacity in the furnace circuit. The next step of rotation causes the cam plate 128 to actuate its switch 138 to include a second unit of two microfarads in the circuit while cam plate 126 opens its switch 136 to eliminate the first unit of one microfarad from the system. The third step of rotation causes the first unit of one microfarad to be added to the second unit of two microfarads giving a total of three microfarads added capacity. On the fourth step the third unit of four microfarads is added while the first two units are cut out of the circuit. Thereafter the first unit and then the second unit and finally both the first and second units are added by additional step by step rotation of shaft 12 to provide five, six and seven microfarads capacity in the circuit. Continued rotation of shaft 12 serves to cut out the first three units and insert a unit of eight microfarad capacity. The other units are added in a similar way to increase the capacity of the circuit by substantially uniform steps until the desired capacity has been introduced into the circuit. However the generator circuit is broken in making each capacity change whether adding or removing a capacitor, since shaft 12 must be retracted to disengage the feeler plate from stud 120 in order to rotate shaft 12 at all.

With either form of the invention described the operator is required to make two deliberate and successive operations before any capacitor can be removed from the circuit and before a large capacitor can be added or removed. Moreover, the motions required are interrupted momentarily by the successive and different directions of movement required so that the operator cannot swing through the operation so quickly as to cut out a large capacitor before the generator circuit is broken. The dangers of severe arcing at the contacts are thus eliminated while the stages of increase in capacity can be varied in sufficiently small increments to insure continued high efficiency in operation with a power factor closely approaching unity.

Although the foregoing description and the drawings refer specifically to two particular forms of the invention, the various elements of the combination are each capable of numerous changes in form, construction and arrangement to attain the advantages of the present invention. In view thereof it should be understood that the particular embodiments shown and described are intended to be illustrative only and are not intended to limit the scope of the invention.

We claim:

1. An induction furnace circuit including a generator, an induction coil and a plurality of capacitors connected together in a resonant circuit, generator switch operating means movable to connect and disconnect the generator to said circuit, capacitor switch operating means movable to connect and disconnect said capacitors to said circuit, control means for said circuit having a shaft mounted for movement in axial and rotary directions, means on said shaft engageable with the generator switch actuating means to operate the same to include the generator in said circuit on axial movement of the shaft to a predetermined position, means movable with the shaft on rotation thereof to actuate said capacitor switch actuating means for progressively varying the number of said capacitors included in said circuit, spaced stop means, and limiting means movable with said shaft between said stop means to limit the arc of rotation of the shaft and the number of said capacitors which may be added to or removed from the circuit while said shaft is in said predetermined position, said limiting means being disengageable from said stop means on axial movement of said shaft to permit further rotation of the shaft and further variation of the number of capacitors included in said circuit when the generator circuit is broken.

2. Means for controlling an induction furnace circuit which includes a generator, a unit capacitor and a divided capacitor embodying several sections differing in capacity, said control means comprising a shaft mounted for movement in axial and rotary directions, means urging said shaft axially to a projected position, generator switch actuating means positioned to be engaged by said shaft when in said projected position to complete the connection of said generator to said furnace circuit, cam means connected to said shaft and rotatable therewith, and capacitor switch actuating members positioned to be engaged by said cams to include said unit capacitor and said sections of the divided capacitor in said furnace circuit, said cam means being shaped to operate said actuating members in a predetermined sequence on rotation of said shaft.

3. Means for controlling an induction furnace circuit which includes a generator, a unit capacitor and a divided capacitor embodying several sections differing in capacity, said control means comprising a shaft mounted for movement in axial and rotary directions, means urging said shaft axially to a projected position, generator actuating means positioned to be engaged by said shaft when in said projected position to complete the connection of said generator to said furnace circuit, cam means connected to said shaft and rotatable therewith, and capacitor actuating members positioned to be engaged by said cams to include said unit capacitor and said sections of the divided capacitor in said furnace circuit, said cam means being shaped to operate said actuating members in a predetermined sequence on rotation of said shaft, spaced stop means, and limiting means movable with said shaft between said stop means when the shaft is in said projected position to limit rotation of said shaft but disengageable from said stop means on axial movement of the shaft to permit free rotation of the shaft when said generator is disconnected from the furnace circuit.

4. Means for controlling an induction furnace circuit which includes a generator, a unit capacitor and a divided capacitor embodying several sections differing in capacity, said control means comprising a shaft mounted for movement in axial and rotary directions, means urging said shaft axially to a projected position, generator actuating means positioned to be engaged by said shaft when in said projected position to complete the connection of said generator to said furnace circuit, cam means connected to said shaft and rotatable therewith, and capacitor actuating members positioned to be engaged by said cams to include said unit capacitor and said sections of the divided capacitor in said furnace circuit, said cam means being shaped to operate said actuating members in a predetermined sequence on rotation of said shaft, stop means, limiting means movable with said shaft and engageable with said stop means when the shaft is in said projected position to limit rotation of said shaft, and ratchet elements on said shaft and a stationary portion of said control means permitting rotation of said shaft in one direction only while in said projected position, said ratchet elements and the limiting means being rendered inoperative on axial movement of the shaft to permit free rotation of the shaft in either direction when said generator is disconnected from the furnace circuit.

5. Means for controlling an induction furnace circuit which includes a generator, a unit capacitor and a divided capacitor embodying several sections differing in capacity, said control means comprising a shaft mounted for movement in axial and rotary directions, means urging said shaft axially to a projected position, generator actuating means positioned to be engaged by said shaft when in said projected position to complete the connection of said generator to said furnace circuit, cam means connected to said shaft and rotatable therewith when the shaft is moved axially away from said projected position, and capacitor actuating members positioned to be engaged by said cams to include said unit capacitor and said sections of the divided capacitor in said furnace circuit, said cam means being shaped to operate the capacitor actuating members associated with the sections of the divided capacitor in a predetermined order to progressively increase the capacity included in the furnace circuit and thereafter to include said unit capacitor in said circuit and cut out the divided capacitor as the shaft and cams continue to rotate in the same direction.

6. Means for controlling an induction furnace circuit which includes a generator, a unit capacitor and a divided capacitor embodying several sections, said control means comprising a shaft mounted for movement in axial and rotary directions, means urging said shaft axially to a projected position, generator actuating means positioned to be engaged by said shaft when in said projected position but movable to break the connection of said generator to said furnace circuit when said shaft is retracted from its projected position, cam means connected to said shaft and rotatable therewith, and capacitor actuating members positioned to be engaged by said cams to include said unit capacitor and said sections of the divided capacitor in said furnace circuit, positioning means movable with said shaft and having a projection thereon, stop means located adjacent said positioning means and engageable by said projection to prevent rotation of said shaft while in said projected position, said projection being axially movable with said shaft out of engagement with said stop means when said shaft is retracted far enough to cause the generator to be disconnected from said circuit.

7. A device for controlling the power factor in an induction furnace circuit comprising a rotating and reciprocating shaft, a power source, a group of capacitors, a series of cams mounted on said shaft, a microswitch associated with each of said cams and operable to connect and disconnect said capacitors in said circuit upon rotation of said cams, another switch positioned to be engaged and actuated by said shaft on axial movement thereof and operable to include said power source in said circuit when said shaft is in a predetermined position, and means providing for limited rotation of said shaft when in said predetermined position.

8. A device for controlling the power factor in an induction furnace circuit comprising a rotating and reciprocating shaft, a power source, a group of capacitors, a series of cams mounted on said shaft, a microswitch associated with each of said cams and operable to connect and disconnect said capacitors in said circuit upon rotation of said cams, another switch positioned to be engaged and actuated by said shaft on axial movement thereof and operable to include said power source in said circuit when said shaft is in a predetermined position, ratchet means permitting rotation of said shaft in one direction only when said shaft is in said predetermined position, and stop means limiting the arc through which said shaft may be rotated when in said predetermined position, said ratchet means and stop means being rendered inoperative on axial movement of said shaft to a position in which said power source is cut out of said circuit.

9. Control means for an induction furnace circuit which includes a source of power and a plurality of capacitors, said control means comprising a plurality of capacitor switches for connecting and disconnecting said capacitors in said circuit, a power switch movable to connect and disconnect said source of power to said circuit, operating means for actuating said capacitor and power switches, said operating means being movable to open and close said power switch and also movable progressively from one position to another to actuate said capacitor switches in a sequence to vary the capacity of said circuit by substantially uniform increments, and limiting means providing for limited movement of said operating means when said power switch is closed, said limiting means being rendered inoperative when said power switch is opened.

References Cited in the file of this patent

UNITED STATES PATENTS

| Number | Name | Date |
| --- | --- | --- |
| 1,833,617 | Northrup | Nov. 24, 1931 |
| 1,845,910 | Dreyfus | Feb. 16, 1932 |
| 1,849,309 | Northrup | Mar. 15, 1932 |
| 1,951,733 | Knieszner | Mar. 20, 1934 |
| 1,961,621 | Northrup | June 5, 1934 |
| 2,451,224 | Johnson | Oct. 12, 1948 |
| 2,511,026 | Wadhams et al. | June 13, 1950 |
| 2,522,871 | Hansell | Sept. 19, 1950 |
| 2,594,181 | Kliegl et al. | Apr. 22, 1952 |